United States Patent
Chrysanthakopoulos et al.

(10) Patent No.: US 7,343,441 B1
(45) Date of Patent: Mar. 11, 2008

(54) METHOD AND APPARATUS OF REMOTE COMPUTER MANAGEMENT

(75) Inventors: Georgios Chrysanthakopoulos, Kirkland, WA (US); Pasquale DeMaio, Bellevue, WA (US); Valerie R. See, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 870 days.

(21) Appl. No.: 09/676,544

(22) Filed: Sep. 29, 2000

Related U.S. Application Data

(63) Continuation-in-part of application No. 09/515,424, filed on Feb. 29, 2000, now abandoned, which is a continuation-in-part of application No. 09/488,015, filed on Jan. 20, 2000, now abandoned.

(60) Provisional application No. 60/169,718, filed on Dec. 8, 1999.

(51) Int. Cl.
*G06F 13/20* (2006.01)
*G06F 15/16* (2006.01)
*H04L 9/00* (2006.01)

(52) U.S. Cl. .................. 710/313; 709/236; 709/237; 713/171

(58) Field of Classification Search .......... 709/222, 709/223, 234, 237, 236; 370/252, 254; 710/313; 713/159, 171, 172
See application file for complete search history.

(56) References Cited

U.S. PATENT DOCUMENTS

| 4,858,117 | A | * | 8/1989 | DiChiara et al. | 711/208 |
|---|---|---|---|---|---|
| 4,935,962 | A | * | 6/1990 | Austin | 713/159 |
| 5,218,701 | A | * | 6/1993 | Miyazaki | 713/202 |
| 5,452,433 | A | * | 9/1995 | Nihart et al. | 709/223 |
| 5,537,099 | A | * | 7/1996 | Liang | 340/5.74 |
| 5,615,262 | A | * | 3/1997 | Guy et al. | 713/192 |
| 5,652,837 | A | * | 7/1997 | Warchol et al. | 713/200 |
| 5,784,581 | A | * | 7/1998 | Hannah | 710/110 |
| 5,845,152 | A | | 12/1998 | Anderson et al. | |
| 5,953,511 | A | | 9/1999 | Sescila et al. | |

(Continued)

FOREIGN PATENT DOCUMENTS

CA 2205096 11/1998

(Continued)

OTHER PUBLICATIONS

IEEE Microprocessor Standards Zone, IEEE 1394 Overview, 2003, IEEE, pp. 1-3.*

(Continued)

*Primary Examiner*—Mark H. Rinehart
*Assistant Examiner*—Christopher Daley
(74) *Attorney, Agent, or Firm*—Birch, Stewart, Kolasch & Birch, LLP

(57) ABSTRACT

A computer being controlled is coupled via a communications bus to at least one other device comprising one or more authorized management devices. The one or more authorized management devices are coupled to a management port. Only management commands received from authorized management devices via the management port may be executed or otherwise responded to. Management commands received from other devices are ignored. In a preferred embodiment, the communication bus is an IEEE 1394 serial bus. In this manner, the present invention provides for the use of more direct communication technologies, such as the IEEE 394 serial bus, while simultaneously providing a greater degree of security than previously available.

24 Claims, 4 Drawing Sheets

U.S. PATENT DOCUMENTS

| | | | |
|---|---|---|---|
| 6,212,633 B1 | 4/2001 | Levy et al. | |
| 6,212,635 B1* | 4/2001 | Reardon | 713/165 |
| 6,263,456 B1 | 7/2001 | Boxall et al. | |
| 6,279,123 B1 | 8/2001 | Mulrooney | |
| 6,298,406 B1 | 10/2001 | Smyers | |
| 6,353,898 B1 | 3/2002 | Wipfel et al. | |
| 6,374,399 B1 | 4/2002 | Mann | |
| 6,408,334 B1* | 6/2002 | Bassman et al. | 709/223 |
| 6,449,651 B1* | 9/2002 | Dorfman et al. | 709/229 |
| 6,480,901 B1* | 11/2002 | Weber et al. | 709/246 |
| 6,526,489 B1* | 2/2003 | Kikuchi et al. | 711/164 |
| 6,574,656 B1* | 6/2003 | Nagaoka et al. | 709/201 |
| 6,584,499 B1* | 6/2003 | Jantz et al. | 709/220 |
| 6,657,956 B1* | 12/2003 | Sigaud | 370/230 |
| 6,687,835 B1* | 2/2004 | Hirano et al. | 713/202 |
| 6,772,253 B1* | 8/2004 | Slaight et al. | 710/105 |
| 6,873,652 B1* | 3/2005 | Palm | 375/222 |
| 2001/0003827 A1* | 6/2001 | Shimamura | 709/206 |

FOREIGN PATENT DOCUMENTS

| | | |
|---|---|---|
| EP | 000827059 A2 * | 4/1998 |
| EP | 0866591 A1 | 9/1998 |
| EP | 0920156 A | 6/1999 |
| WO | WO 99/22303 | 5/1999 |

OTHER PUBLICATIONS

P1394 Standard for a High Performance Serial Bus, Nov. 21, 1995, IEEE Standards Department ,P1394 Draft 8.0v4.*

Futurebus+, http://granite.sru.edu/~stringer/fb.html, unknown date.*

Richard Nass, "Firewire Interface Connects PCs to Consumer Electronics Devices", *Electronic Design*, Aug. 5, 1996.

Gil Bassak, "Interface Chips are Poised to Power 1394 Serial Bus," *Electronic Engineering Times*, Nov. 23, 1998.

IBM Netfinity Advanced Systems Management, available at http://www.pc.ibm.com/us/techlink/wtpapers/sysmanproc.html, downloaded Feb. 14, 2000.

Compaq.com—Remote Insight Product Overview available at http://www/compaq.com/products/servers/management/ri-wp.html, downloaded Feb. 14, 2000.

Dan Steinberg and Yitzhak Birk, "An Empirical Anaysis of the IEEE-1394 Serial Bus Protocol," *IEEE Micro*, Jan.-Feb. 2000.

William F. Alexander, A WDM IEEE 1394 Configuration ROM Decoder , *Dr. Dobb's Journal*, Dec. 1999.

Steinberg, et al., *An Empirical Analysis of the IEEE-1394 Serial Bus Protocol*, IEEE 2000.

D. Anderson,"FireWire System Architecture", Second Edition,PHY Packet Format, Sep. 20, 1999; Addison Wesley, Reading, Massachusetts, US XP002171989 Chapters 10 and 13, , pp. 213-219 and pp. 265-272.

* cited by examiner

METHOD AND APPARATUS OF REMOTE COMPUTER MANAGEMENT

CROSS-REFERENCE TO RELATED APPLICATIONS

This application is a continuation-in-part of U.S. patent application Ser. No. 09/515,424 entitled "METHOD AND APPARATUS FOR PROVIDING SECURE REMOTE DEBUGGING OF COMPUTER SOFTWARE OVER A SERIAL BUS," filed on Feb. 29, 2000, which is a continuation-in-part of U.S. patent application Ser. No. 09/488,015 entitled "METHOD AND APPARATUS FOR REMOTELY DEBUGGING COMPUTER SOFTWARE OVER A SERIAL BUS," filed on Jan. 20, 2000, both assigned to the same assignee of the present invention. Furthermore, priority is claimed to U.S. Provisional Patent Application No. 60/169,718, filed on Dec. 8, 1999.

TECHNICAL FIELD

The present invention relates generally to computer management techniques and, in particular, to a method and apparatus for remote computer management.

BACKGROUND OF THE INVENTION

Techniques for performing remote management of computers are well known in the art. Remote management generally refers to the operational control of a given computer by another, remotely located computer. Examples of such control include, but are not limited to, configuring software, re-boot operations, status determination of field-replaceable units (FRUs), diagnostic procedures, firmware downloading, keyboard/video/mouse redirections, configuring the operating system, etc. Some management commands are of value when the computer being managed does not have a fully functioning operating system installed that would typically provide the mechanisms for managing the computer. This requires specialized mechanisms for controlling the computer that don't require the operating system to be fully functioning.

In many systems, computers to be managed are coupled via local area networks (LANs), serial data links or modems to a managing entity, such as a remotely located management terminal (e.g., another computer). Point-to-point links, such as so-called RS-232 serial links, are typically dedicated for this purpose and are therefore subject to more direct control by an operator of the system thereby allowing physical security to be implemented and making logical security less of a concern. However, RS-232 serial connections are limited in distance and to point-to-point connections. Additionally, these point-to-point links typically exist apart from the network connections used to convey other types of traffic between the computer being managed and other computers. Other forms of networked communication, such as LAN, wide area networks (WAN) and IEEE 1394 (absent the teachings of the present invention), allow greater distance connectivity choices but require complicated logical security and cannot support general communication simultaneously, requiring additional special purpose communication hardware.

Such techniques are further limited. For example, while it is possible using these techniques for the remote computer to access key components including memory and memory-mapped devices (i.e., memory accessed by software, such as operating systems, memory mapped hardware devices to be managed and service processors) of the computer being controlled, the process is generally very difficult requiring complex and non-standardized hardware. Generally, in such systems, the computer's processor must act as an intermediary between the component under consideration and a remote management entity, thereby diminishing the reliability of management commands. However, other types of communication links are capable of providing such direct access to key computer components. For example, the IEEE 1394 serial bus allows a remote computer to directly access internal computer components without the intervention of the computer's processor. Furthermore, this remote access does not prevent general communication on the 1394 serial bus, which requires simultaneous use of the computer's processor. For this reason, the IEEE 1394 serial bus represents an attractive option for use in remote computer management. (The IEEE 1394 serial bus standard is based largely upon the internationally adopted ISO/IEC 13213 (ANSI/IEEE 1212) CSR Architecture Specification and the IEEE 1394-1995 Serial Bus Specification.)

Although technologies that allow more direct access to a computer's components, such as IEEE 1394 serial bus technology, can be used to advance remote computer management techniques, such techniques do raise security concerns. That is, any communication link that provides a remote management terminal access to a given computer's components may also be exploited by other devices to gain access. For example, it may be possible for any device coupled to the IEEE 1394 serial bus to similarly gain access to a given computer's internal components. Similar security concerns arise with other networking technologies, such as "ETHERNET" networks. These security holes represent a significant impediment to the use of such technology in the area of remote computer management. Thus, a technique that overcomes such security concerns in the context of remote computer management would represent advancement in the art.

SUMMARY OF THE INVENTION

The present invention overcomes the limitations described above by providing a technique whereby only authorized devices are allowed to provide management commands to a computer being controlled. In particular, the computer being controlled is coupled via a management port to a communications bus that is in turn coupled to at least one other device comprising one or more authorized management devices. Only management commands received from authorized management devices via the management port may be executed or otherwise responded to. Other devices coupled to the communication bus but not to the management port cannot be an authorized management device, and any management commands received from such devices are ignored. In a preferred embodiment, the communication bus comprises an IEEE 1394 serial bus. In this manner, the present invention provides for the use of more direct communication technologies, such as the IEEE 1394 serial bus, while simultaneously providing a greater degree of security than previously available. Furthermore, greater reliability is provided because the processor of the computer being controlled does not act as an intermediary for management commands. Further still, the present invention allows management commands and normal data traffic to be conveyed using the same communication medium. These and other advantages and features of the subject invention will become apparent from the detailed description of the invention that follows.

BRIEF DESCRIPTION OF THE DRAWINGS

In the detailed description of presently preferred embodiments of the present invention which follows, reference will be made to the drawings comprised of the following figures, wherein like reference numerals refer to like elements in the various views and wherein.

DETAILED DESCRIPTION OF THE INVENTION

Figure 1:
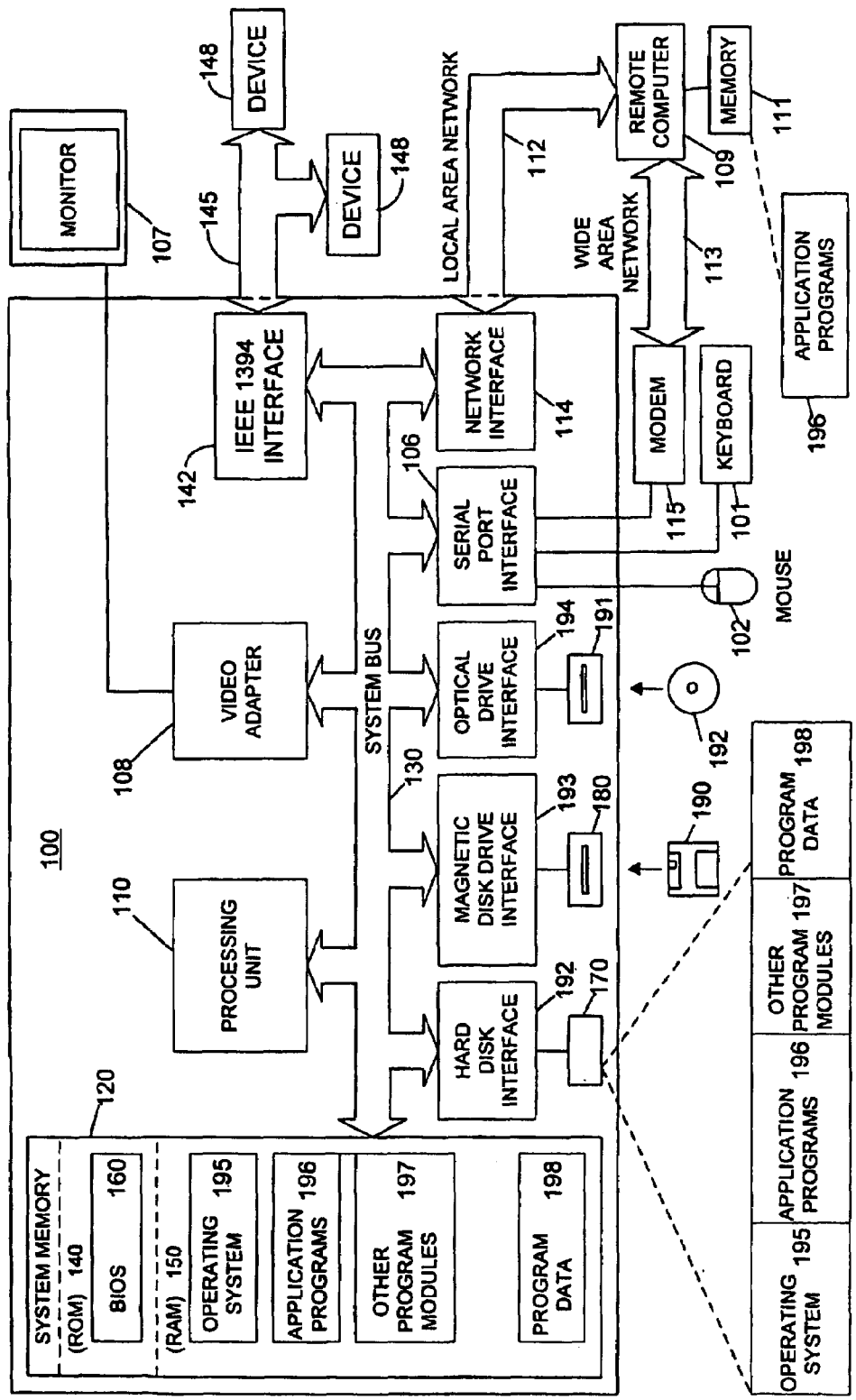
FIG. 1 is a schematic block diagram of a conventional general-purpose digital computing environment that can be used to implement various aspects of the present invention.

The present invention may be more fully described with reference to FIGS. 1-4. FIG. 1 is a schematic diagram of a conventional general-purpose digital-computing environment that can be used to implement various aspects of the present invention. A computer 100 includes a processing unit 110, a system memory 120 and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes a read only memory (ROM) 140 and a random access memory (RAM) 150.

A basic input/output system (BIOS) 160 (or other firmware model, such as the so-called Extensible Firmware Interface; collectively referred to as platform firmware) containing the basic routines that help to transfer information between elements within the computer 100, such as during start-up, is stored in ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for the computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. In particular, the RAM 150 will, from time to time, store various device drivers, as known in the art. A user can enter commands and information into computer 100 through input or selection devices, such as a keyboard 101 and a pointing device 102. Alternatively, a user can enter commands and information on a remote computer which commands are then converted to management commands communicated to the computer via communication buses such as LAN, WAN or IEEE 1394 serial bus. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

A serial interface in the form of an IEEE 1394 interface 142 is preferably provided. The IEEE 1394 interface 142 couples an IEEE 1394-compliant serial bus 145 to the system bus 130 or similar communication bus. The IEEE 1394-compliant serial bus 145, as known in the art, allows multiple devices 148 to communicate with the computer 100 and each other using high-speed serial channels and in particular allows other devices coupled to the serial bus to have direct access to several components of the computer 100.

The computer 100 can operate in a networked environment using logical connections to one or more remote computers, such as a remote computer 109. The remote computer 109 typically includes at least some of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to local network 112 through a network interface or adapter 114. When used in a WAN networking environment, the computer 100 and remote computer 109 may both include a modem 115 or other means for establishing a communications over wide area network 113, such as the Internet. The modem 115, which may be internal or external, is connected to system bus 130 via the serial port interface 106. In a networked environment, program modules depicted relative to the computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server.

Figure 2:
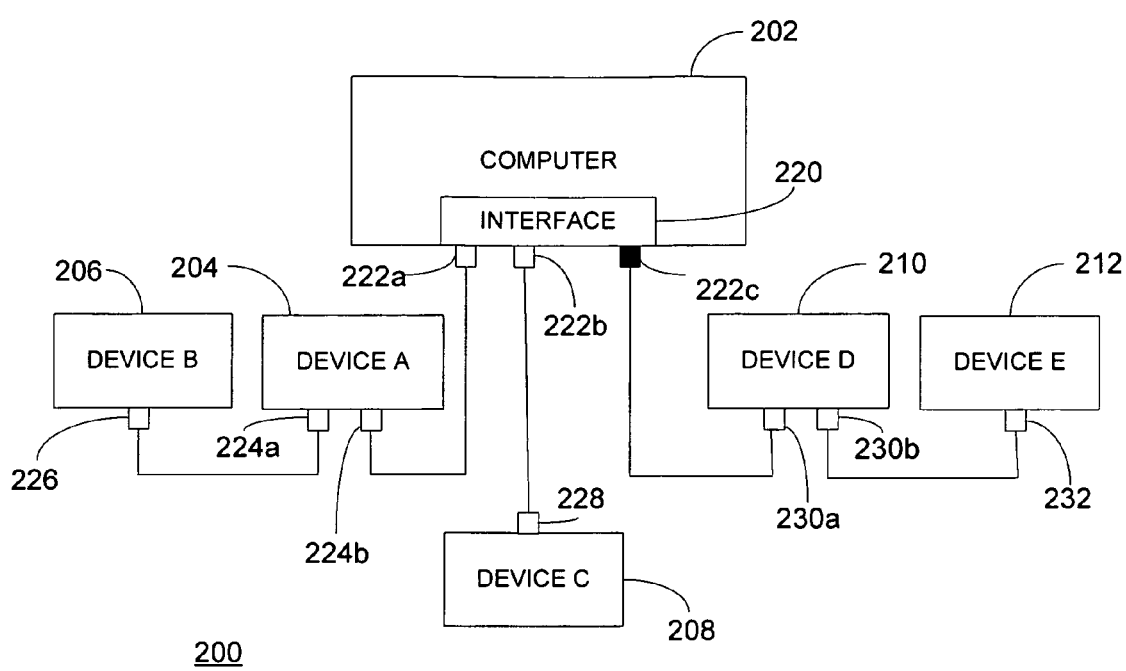
FIG. 2 is a schematic block diagram of a computer system to which the present invention may be beneficially applied.

Referring now to FIG. 2, there is illustrated a schematic block diagram of a computer system 200 to which the present invention may be beneficially applied. In particular, the computer system 200 comprises a computer 202 coupled via a communication bus to a plurality of devices 204-212, labeled Device A-E. The computer 202 can be a computer as illustrated in FIG. 1. Likewise, the devices 204-212 may also be such computers, or may be specialized devices capable of communicating via the communication bus.

In a preferred embodiment, the communication bus comprises an IEEE 1394 serial bus. To this end, the computer 202 and each of the devices 204-212 comprises an interface 220 (shown only for the computer 202) that implements the IEEE 1394 protocol. Each interface 220 functionally constitutes a node, as that term is used in IEEE 1394, which in turn supports one or more ports. In general, the device to which a node is coupled acts as the "local host" for that node. For example, the computer 202 is the local host for a node implemented by the interface 220. It is not necessary for every node to have a local host, nor is it necessary that the local host always be powered. Each of the nodes may have identical construction, although some of the nodes can be simplified because of their specific functions. Thus, the nodes can be modified to meet the needs of the particular local host. For example, the node having the computer 202 as its local host, as illustrated, has three ports 222a-c; "Device A" and "Device D" each support two ports, labeled with reference numerals 224a-b and 230a-b, respectively; and "Device B", "Device C" and "Device E" each support only one port, labeled with reference numerals 226, 228 and 232, respectively.

A particular feature of the present invention is the use of a management port. As used herein, a management port is a predetermined port supported by a node for the benefit of the node's local host, which port is deemed the only port authorized to receive management commands from devices coupled to the communication bus. A management command is any type of message, request or command received from any device coupled to the communication bus relating to remote management, including attempts to read data from or write data to internal components of the computer being controlled. Examples of management commands include, but are not limited to, "system reset", "system power down", "system power up", "read status" (from a given device), "read/set configuration" (of a specific device or of the system as a whole), etc. For example, the computer 202 shown in FIG. 2 comprises a single management port 222c. Thus, only management commands received from at least one of the devices 210, 212 coupled to the management port 222c are given consideration by the computer 202. Operations of the computer 202 and interface 220 as they pertain to the present invention are more fully described with reference to FIG. 3.

Figure 3:
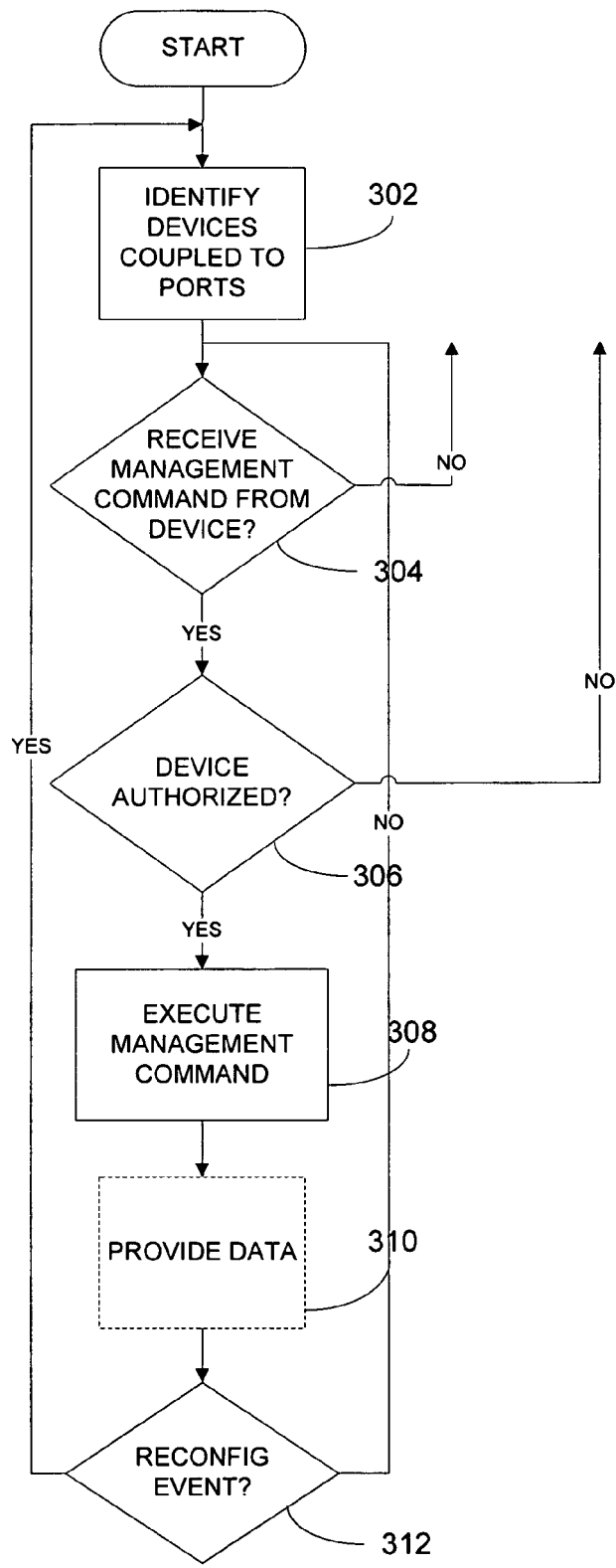
FIG. 3 is a flow chart illustrating a method for controlling a computer in accordance with the present invention.

Referring now to FIG. 3, at step 302, the computer identifies all devices coupled to its ports and, more particularly, which devices are authorized management devices. In a preferred embodiment, an authorized management device can only be a device coupled, either directly or indirectly, to a management port of the computer. For example, "Device D" in FIG. 2 is coupled directly to the management port 222c, whereas "Device E" is indirectly coupled to the management port 222c. As its name would imply, an authorized management device is any device coupled to the communication bus that is authorized to issue management commands, e.g., a remote management terminal. A management port is a predetermined port (for example, as designated by configuration data entered by a user or through a standardized assumption) that is assumed to be trusted from a security viewpoint.

In a preferred embodiment, the communication bus is an IEEE 1394 serial bus. In this case, step 302 is preferably implemented in accordance with the method taught in co-pending U.S. patent application Ser. No. 09/515,424 entitled "METHOD AND APPARATUS FOR PROVIDING SECURE REMOTE DEBUGGING OF COMPUTER SOFTWARE OVER A SERIAL BUS". As taught therein, an IEEE 1394 bus manager (implemented at least in part by, e.g., the interface 220) generates a topology map based on the self-identification packets issued by each device after a reset of the serial bus. The topology map illustrates the hierarchy of devices coupled to each port of a given device, e.g., the computer 202 being controlled. Where the computer being controlled and its corresponding interface support the bus manager, the map is readily available for use. If however, another device implements the bus manager through its corresponding interface, the topology map may be provided to the computer being controlled, either by "pushing" the map to the computer being controlled or by simply allowing the computer to access the map when necessary. Based on the topology map, the interface on the computer being controlled can determine which devices are coupled to its management port, and which devices are therefore authorized. Those having ordinary skill in the art will recognize that further criteria may be used to determine authorized management devices. For example, only devices directly coupled to the management port may be authorized. As another example, only devices a certain number of "hops" away from the management port (i.e., devices indirectly coupled to the management port through at least a given number of intermediary devices) may be authorized.

Regardless, at step 304, it is determined whether the computer has received a management command. In the preferred case of IEEE 1394, this determination is made by the interface by inspecting the received data. Step 304 is continuously repeated if no such management command is received. When a management command is received, processing continues at step 306 where it is determined whether the management command was received from an authorized device. If, at step 306, it is determined that the management command was not received from an authorized device, the management command is ignored and processing continues at step 304. Again, in the preferred case of IEEE 1394, these steps are performed by the 1394 interface based on its knowledge of the topology map described above and the predetermined identity of the management port. Thus, the received management command is inspected to determine its source identification. The source identification is then compared with identifications of authorized devices as determined by the topology map and knowledge of the management port identification.

The technique described above relies on knowledge of the source identification of a received command to determine whether an authorized management device sent the command. In an alternative embodiment, rather than relying on source identification to ascertain authorization, it may be preferable to rely only upon knowledge of the receiving port's identification. Such a technique necessarily depends on the ability of the device being managed to discriminate, for each management command received, the identity of a corresponding receiving port. For example, this could be inherently done where each receiving port has its own separate received data buffer. Thus, it is understood that data stored in a particular port's buffer has been received over that port. Alternatively, such identification could be explicit. For example, a protocol stack or similar functionality within the device being managed could cause a port identification to be appended to each received management command. In this manner, simple inspection of the appended data will determine the receiving port's identification. Where this alternative technique is used, the processing described relative to step 302 need not be performed since source identification is no longer used. Likewise, step 306 need not rely upon a topology map and instead simplifies to ascertaining the identification of the port through which a management command was received and comparing that identification with the known identification of the management port.

If the management command was received from an authorized device, regardless of the manner in which it was determined, processing continues at step 308 where the management command is executed. Generally, management commands may be separated into two categories, those that require participation of the device's controlling processor on behalf of the device being controlled and those that do not. In the first category are those commands, for example, inquiring about the status of a given component within the device being managed, which component can only be tested by the device's controlling processor. The second category includes, for example, management commands that seek only to inspect or alter certain memory locations within the computer's memory requiring no, or only indirect, intervention on the part of the device's controlling processor. This categorization of management commands is particularly well supported by IEEE 1394-compliant communication busses. In the IEEE 1394 context, commands in the first category are passed on to the host for execution, whereas commands in the second category are instead implemented by the IEEE 1394 interface without intervention by the host. In a preferred IEEE 1394 implementation, differentiation between the two types of management commands is achieved, at least in part, through use of asynchronous and isochronous channels. In particular, management commands that do not require host intervention are sent via an asynchronous channel via the management port, whereas management commands requiring host intervention are sent via an isochronous channel via the management port.

Regardless, at step 310, data may be provided to one or more devices coupled to the communication bus (or through any other output path, e.g., a monitor or network connection) in response to the management command. For example, data may be provided to the authorized management device that issued the management command. Alternatively, the management command may require that data be sent to one or more devices other than the authorized management device. Once again, the type of data sent at step 310 is dependent upon the type of management command executed.

Processing continues at step 312 where it is determined whether a reconfiguration event has occurred. A reconfiguration event in the context of the present invention is an event indicative of the fact that the topology of devices coupled to the computer has changed in some manner, thereby necessitating that the computer again identify the devices coupled to the communication bus. Note that although this step is illustrated as occurring at a given point within a sequence of steps, it is understood that a reconfiguration event could occur at any time and detection of such an event can likewise occur at any time. Where the communication bus is an IEEE 1394 serial bus, the configuration event is preferably a bus reset as determined by the 1394 interface. Such bus resets may be generated on command by a device coupled to the bus, or certain physical events, such as the addition or removal of a device, may automatically trigger a bus reset. Regardless, if no such reconfiguration event is detected, processing continues at step 304 where further management commands are awaited. If, however, a reconfiguration event is detected, processing continues at step 302 where the processing of identifying devices, particularly authorized management devices, is repeated. Note that where the alternative technique, described above, for determining whether a management command is authorized (i.e., through the use of the receiving port's identification alone) is used, step 312 becomes unnecessary. In this case, processing instead continues at step 304.

Figure 4:
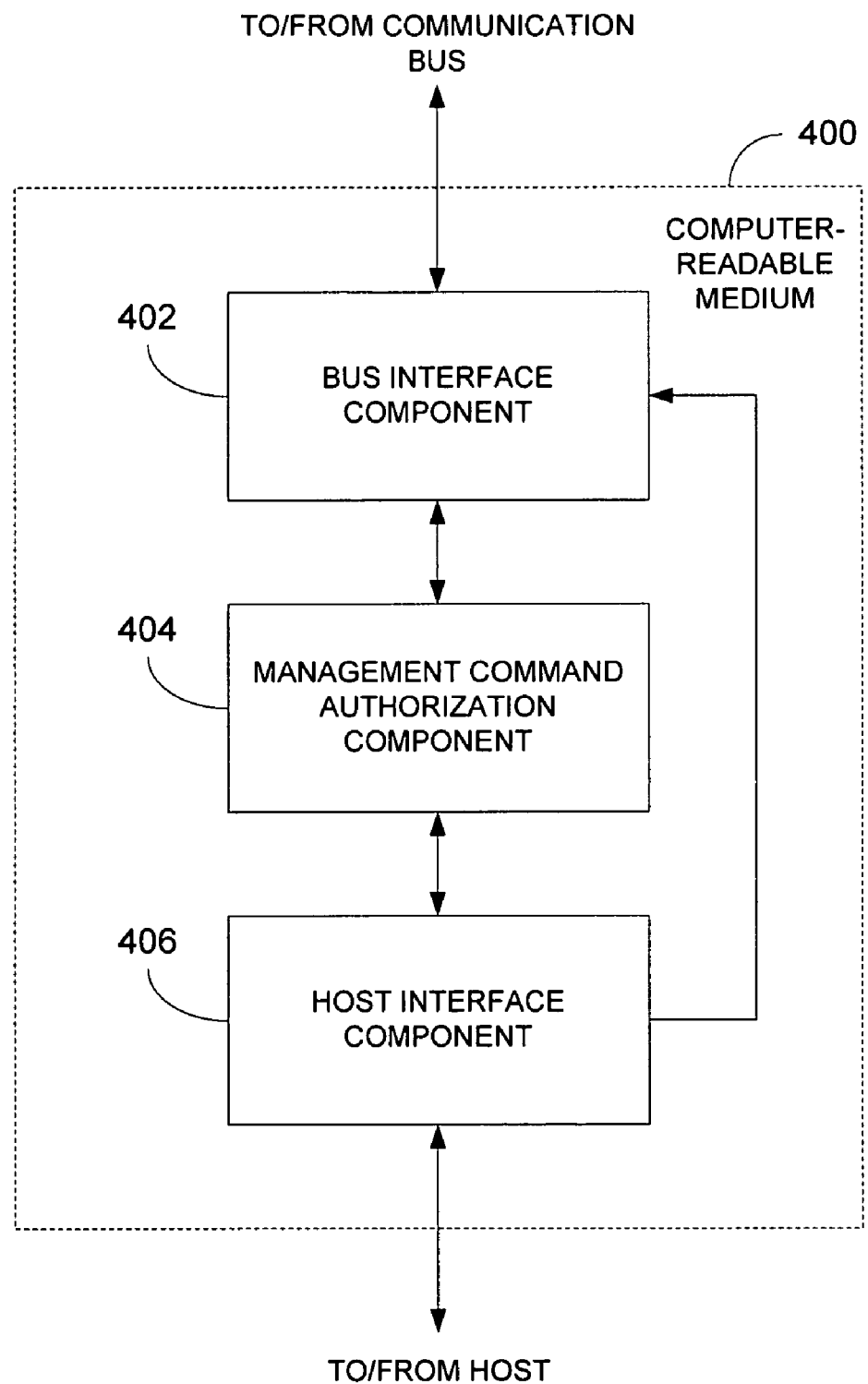
FIG. 4 is a schematic block diagram of an implementation of the present invention based on a computer-readable medium.

FIG. 4 is a schematic block diagram of an implementation of the present invention based on a computer-readable medium. The computer-readable medium 400 may comprise a hard disk, removable magnetic disks, optical disks, magnetic cassettes, flash memory cards, Bernoulli cartridges, RAMs, ROMs, and the like. It will be appreciated by those skilled in the art that other types of computer-readable media that can store data and/or computer-executable instructions that are accessible by a computer may also be used. Regardless, the computer-readable medium 400 provides nonvolatile storage of computer-readable instructions, data structures, program modules and other data.

The computer-readable medium 400 includes a bus interface component 402, a management command authorization component 404 and a host interface component 406. Each of the components preferably comprises computer-executable instructions. As those having ordinary skill in the art will readily appreciate, various other component arrangements can be devised that encompass the same functionality. The bus interface component 402 supports communications with a communication bus (not shown) and, in particular, routes received management commands to the management command authorization component 404. Additionally, the bus interface component 402 can also send (on behalf of the computer or other device being controlled remotely) data responsive to one or more authorized management commands to devices residing on the communication bus. Such data may be provided to the bus interface component 402 without the intervention of the management command authorization component 404. This is illustrated in FIG. 4 by the arrow from the host interface component 406 to the bus interface component 402. Regardless, in a preferred embodiment, the bus interface component 402 supports communications with an IEEE 1394-compliant serial bus.

The management command authorization component 404 receives one or more management commands from the bus interface component 402 and, using the techniques described above, determines whether such management commands are authorized. If not authorized, the management commands are ignored. If authorized, the management commands are sent to the host interface component 406. Those having ordinary skill in the art will recognize that various functional aspects of the bus interface component 402 may be incorporated into the management command authorization component 404 or vice versa as a matter of design choice.

The host interface component 406 supports communications with the host of the device being controlled. In the context of the present invention, this particularly includes sending appropriate authorized management commands to the host for execution or, when necessary, executing authorized management commands directly. Additionally, when necessary, the host interface component 406 receives data responsive to one or management commands and routes such data to the bus interface component. Once again, those having ordinary skill in the art will recognize that some or all of the functionality encompassed by the host interface component 406 may be incorporated into another component.

Using the techniques described herein, direct access technologies, such as the IEEE 1394 serial bus, may be applied to remote management systems. Using a management port, authorized management devices may be identified such that only management commands received from authorized management devices are executed, while all such other management commands are ignored. In the context of a preferred IEEE 1394 implementation, topology maps are built in response to bus resets, thereby allowing the 1394 interface to identify which devices are connected to which physical ports and to which logical ports, such as a management port. Based on this knowledge, the logical management port can be correlated with a physical management port, which correlation may be communicated to users. In turn, secure remote management operations may be implemented by instructing users that, e.g., "The 1394 port closest to the back of the computer [or identified in some other manner] is the management/debug port. Only devices plugged into this port will be allowed to perform management/debug operations. Only trusted devices should be plugged into this port. Any other device may safely be plugged into the other ports." Using the present invention, greater reliability is provided because the processor of the computer being controlled does not act as an intermediary for management commands. Further efficiencies are realized in that management commands and normal data traffic are conveyed using the same communication medium.

While the foregoing detailed description sets forth presently preferred embodiments of the invention, it will be understood that many variations may be made to the embodiments disclosed herein without departing from the true spirit and scope of the invention. This true spirit and scope of the present invention is defined by the appended claims, to be interpreted in light of the foregoing specifications.

What is claimed is:

1. A method for remotely managing a computer coupled to a communication bus, the method comprising:
   predetermining one port of the computer as a management port and deeming the management port as the only port automatically authorized for receiving one or more management commands and all other ports as not automatically authorized for receiving any management command;
   receiving, via the communication bus, the management command;
   determining whether the management command was received at the management port coupled to the communication bus or received at a second port; and
   if the management command is received at the management port, executing the management command without requiring further authentication or authorization and if the management command is received at the second port ignoring the management command.

2. The method of claim 1, further comprising:
   providing, via the communication bus, data to at least one device coupled to the communication bus in response to the step of executing the management command.

3. A computer-readable medium having stored thereon computer executable instructions for performing the method of claim 2.

4. The method of claim 1, wherein the communication bus is an IEEE 1394-compliant serial bus.

5. A computer-readable medium having stored thereon computer executable instructions for performing the method of claim 1.

6. A computer-readable medium having stored thereon computer executable instructions for performing the method of claim 1.

7. A computer comprising:
   a processor;
   an IEEE 1394 interface, coupled to the processor, comprising one or more ports only one of which is a management port deemed to be the only authorized port for receiving one or more management commands and where all the other ports are not authorized for receiving any management command, wherein the IEEE 1394 interface passes the management command received from the management port to the processor and ignores any management command received at any of the other ports other than the management port; and
   memory, coupled to the processor, having stored thereon computer executable instructions that, when executed by the processor, cause the computer to:
   execute the one or more one management commands received at the management port without requiring further authorization.

8. The computer of claim 7, wherein the computer executable instructions, when executed by the processor, further cause the computer to:
   provide data at any of the ports in response to the management command received at the management port.

9. The computer of claim 7, wherein the computer executable instructions, when executed by the processor, further cause the computer to:
   identify one or more authorized management devices coupled to the management port.

10. A system comprising the computer of claim 7, and further comprising:
    an IEEE 1394-compliant serial bus coupled to the IEEE 1394 interface; and
    a management device coupled either directly or indirectly, via the IEEE 1394-compliant serial bus, to the management port,
    wherein the management device provides the management command.

11. The system of claim 10, wherein the management device is another computer.

12. A computer-readable medium comprising computer-executable components for enabling remote management of a computer via a communication bus, the computer-executable components comprising:
    a bus interface component that communicates with an IEEE 1394-compliant serial bus and that receives one or more management commands via the IEEE 1394-compliant serial bus via an asynchronous or an isochronous channel; and
    a management command authorization component, in communication with the bus interface component, that determines whether each of the one or more management commands is authorized based on whether each of the one or more management commands was received at a management port coupled to the communication bus without requiring further authentication or authorization, and wherein the management port is a predetermined port deemed to be the only port automatically authorized for receiving the one or more management commands.

13. The computer-readable medium of claim 12, wherein the bus interface component communicates with an IEEE 1394-compliant serial bus.

14. The computer-readable medium of claim 12, further comprising:
    a host interface component, in communication with the management command authorization component and a host comprising a portion of the computer, that sends the one or more management commands to the host for execution when the one or more management commands are authorized and require host intervention.

15. The computer-readable medium of claim 14, wherein the host interface component executes the one or more management commands when the one or more management commands are authorized and do not require the intervention of the host.

16. The computer-readable medium of claim 14, wherein the host interface component does not send the one or more management commands to the host when the one or more management commands are not authorized.

17. The computer-readable medium according to claim 12, wherein the one or more management commands are received via an asynchronous or isochronous channel.

18. The computer-readable medium according to claim 17, further comprising a host interface component, in communication with the management command authorization component and a host comprising a portion of the computer, that sends the one or more management commands via the isochronous channel to the host for execution when the one or more management commands are authorized and require host intervention.

19. The computer-readable medium of claim 18, wherein the host interface component receives the one or more management commands via the asynchronous channel and executes the one or more management commands when the one or more management commands are authorized and do not require the intervention of the host.

20. The computer-readable medium of claim 17, wherein the host interface component receives the one or more management commands via the asynchronous channel and executes the one or more management commands when the one or more management commands are authorized and do not require the intervention of the host.

21. A method for remotely managing a computer coupled to a communication bus, the method comprising:

identifying a first device coupled to a first port of the computer and a second device coupled to a second port of the computer, the first port configured to be a management port and deemed to be the only part automatically authorized for receiving one or more management commands such that all other ports are not automatically authorized for receiving any management command;

receiving, via the communication bus, the management command from one of the first and second devices;

determining whether the management command was received at the management port coupled to the communication bus;

when the management command was received at the management port, automatically authorizing the execution of the management command irrespective of an identifier of the first device and without requiring further authentication or authorization, and executing the authorized management command, and when a management command was received at the second port, not authorizing the management command.

22. The method of claim 21, further comprising a step of providing, via the communication bus, data to the first device in response to the step of executing the management command.

23. The method of claim 21, further comprising a step of when the management command was not received at the management port, ignoring the management command.

24. The method of claim 21, wherein the communication bus is an IEEE 1394-compliant serial bus.

* * * * *